United States Patent [19]

Wang

[11] Patent Number: 4,960,205

[45] Date of Patent: Oct. 2, 1990

[54] MULTIPURPOSE STORAGE CASE

[76] Inventor: Bor-Jou Wang, 3/F No. 740, Ching Chen Road, Yung-Ho Taipei Hsien, Taiwan

[21] Appl. No.: 422,274

[22] Filed: Oct. 16, 1989

[51] Int. Cl.⁵ .......................................... B65D 85/612
[52] U.S. Cl. ...................................... 206/387; 206/444
[58] Field of Search ...................... 206/387, 45.15, 310, 206/444

[56] References Cited

U.S. PATENT DOCUMENTS

| | | | |
|---|---|---|---|
| 3,756,383 | 9/1973 | Kryter | 206/444 |
| 4,432,453 | 2/1984 | Berkman | 206/387 |
| 4,712,679 | 12/1987 | Lowe | 206/444 |

FOREIGN PATENT DOCUMENTS

| | | | |
|---|---|---|---|
| 293272 | 11/1988 | European Pat. Off. | 206/387 |
| 262503 | 11/1988 | Fed. Rep. of Germany | 206/444 |
| 7709480 | 3/1979 | Netherlands | 206/387 |
| 2114956 | 9/1983 | United Kingdom | 206/387 |

Primary Examiner—William I. Price
Attorney, Agent, or Firm—Lowe, Price, LeBlanc, Becker & Shur

[57] ABSTRACT

A multipurpose storage case comprising therein a plurality of upper receiving spaces and lower receiving spaces symmetrically disposed at both sides thereof for concomitantly or alternatively receiving therein video tapes, recording tapes, and CDs.

2 Claims, 4 Drawing Sheets

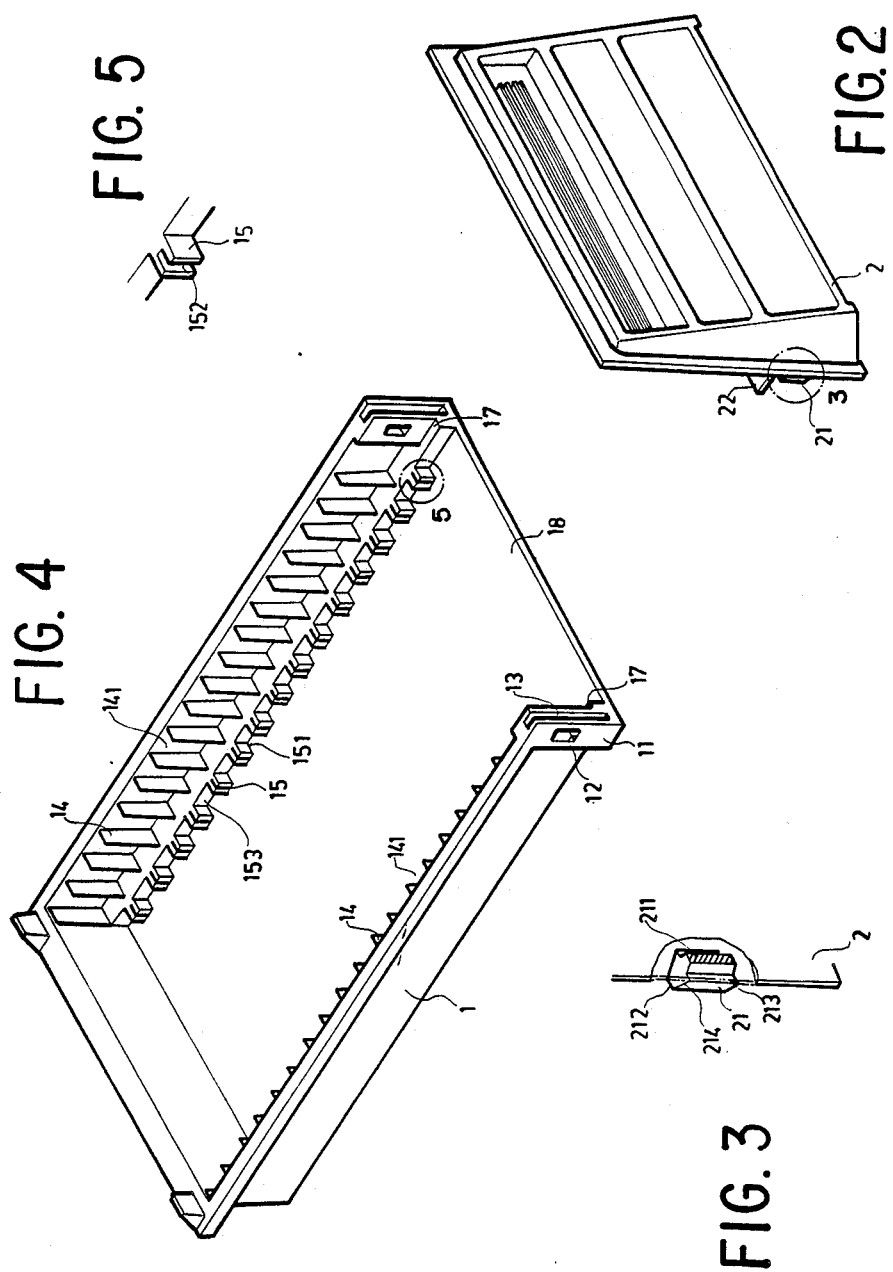

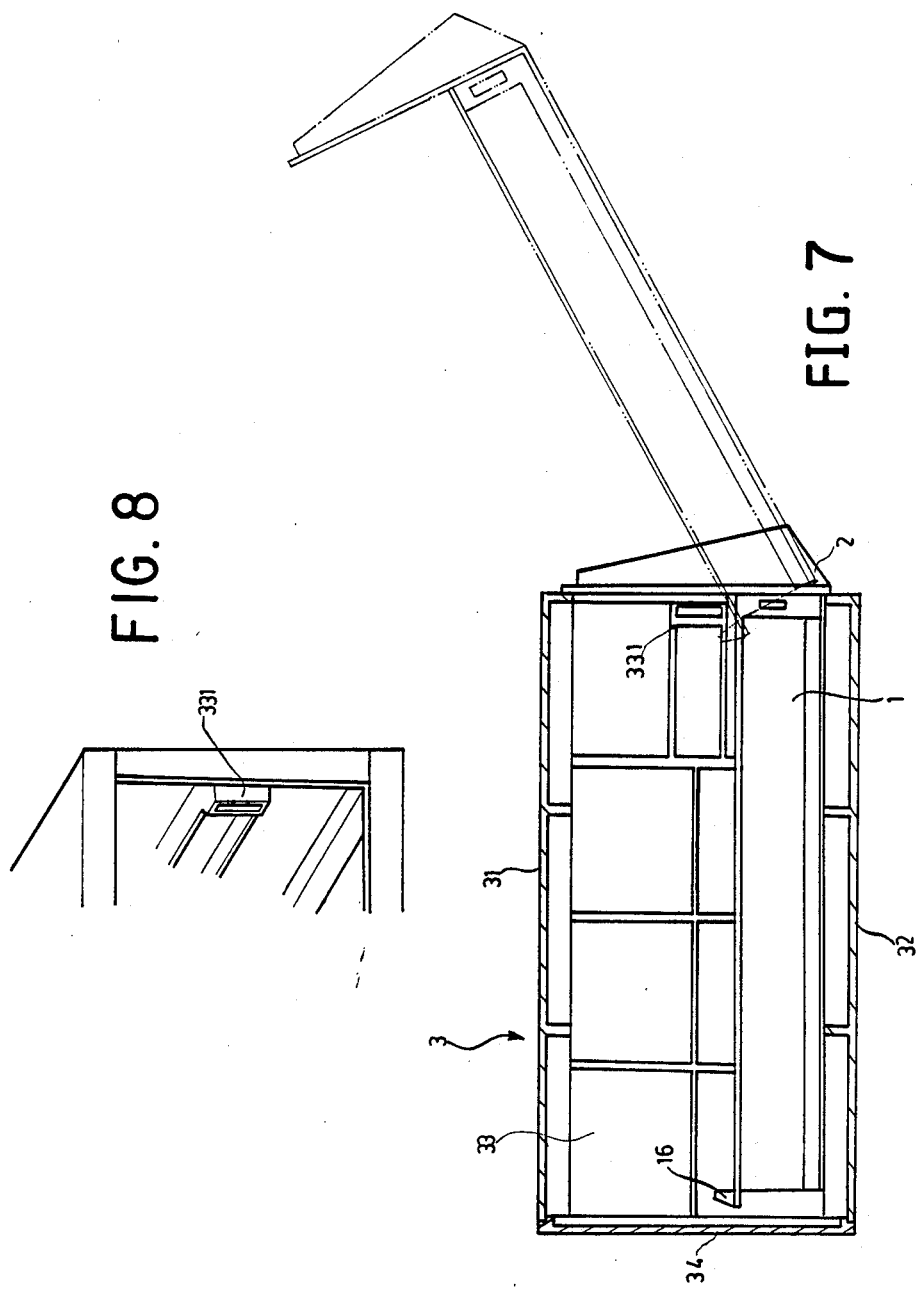

MULTIPURPOSE STORAGE CASE

BACKGROUND OF THE INVENTION

The present invention is related to a kind of storage case and more particularly to a multipurpose storage case utilized for storage of recording tapes, video tapes and CDs concomitantly or alternatively.

Regular storage cases for receiving recording tapes, video tapes or CDs are generally made of wooden material or plastic molded in unity. It is space consuming and applicable for one specific purpose, i.e. utilized for receiving therein one single item, not applicable for receiving recording tapes, video tapes and CDs concomitantly or two of the said three items alternatively.

It is therefore, the main object of the present invention to provide such a multipurpose storage case which is economic, and practical in use.

Another object of the present invention is to provide such a multipurpose storage case in which the detachable, may be received in a casing to minimize space consumption of for convenient carriage or packaging.

Still another object of the present invention is to provide such a multipurpose storage case which includes a plurality of division plates made internally at both sides in the casing to define therebetween a plurality of upper receiving spaces arranged in size suitable for receiving recording tapes, and a plurality of bilaterally disposed projecting blocks having respectively made thereon a bevel notch for setting CDs therein.

A yet further object of the present invention is to provide such a multipurpose storage case concomitantly for receiving therein recording tapes, video tapes and CDs, which includes a plurality of division plates made internally at both sides in the casing to define therebetween a plurality of upper receiving spaces arranged in size suitable for receiving video tapes, and a plurality of bilaterally disposed projecting blocks to define therebetween a plurality of lower receiving spaces arranged in size suitable for receiving recording tapes, which projecting blocks having respectively a notch made thereon for receiving CDs.

SUMMARY OF THE INVENTION

The present invention is to provide such a multipurpose storage case for receiving therein recording tapes, video tapes and CDs, which is generally comprised of a casing coupled with a handle. The casing comprises a pair of connecting ends bilaterally disposed at the front opening having respectively a vertical slot made thereon with a notch transversely piercing through the both sides thereof, two platforms upstanding from the bottom surface thereof at both sides, a plurality of division plates equidistantly mounted on each of the two platforms to respectively define therebetween a plurality of upper receiving spaces. The platforms each comprise unitarily a plurality of projecting blocks horizontally extending therefrom toward the center portion of the bottom surfaces of the casing and defining therebetween a plurality of lower receiving spaces, and the projecting blocks each comprise a notch made thereon in the middle. The handle comprises two trapezoid blocks bilaterally made on the back side to respectively set in the notches of the two vertical slots of the two connecting ends of the casing, and an elongated strip horizontally disposed at the back side above the two trapezoid blocks. After connection of the handle to the casing, the bilaterally disposed upper receiving spaces, lower receiving spaces and the bilateral notches of the bilateral projecting blocks of the bilateral platforms are provided for setting therein recording tapes, video tapes or CDs respectively.

BRIEF DESCRIPTION OF THE DRAWINGS

FIG. 2 is a perspective view of the handle of the embodiment of FIG. 1;

FIG. 3 is a fragmentary view of the circle 3 in FIG. 2;

FIG. 4 is a perspective view of the bottom portion of the embodiment of FIG. 1;

FIG. 5 is a fragmentary view of the circle 5 shown in FIG. 4;

FIG. 7 is a schematic view illustrating the present invention; and

FIG. 8 is a fragmentary view of the embodiment of FIG. 7.

Figure 1:
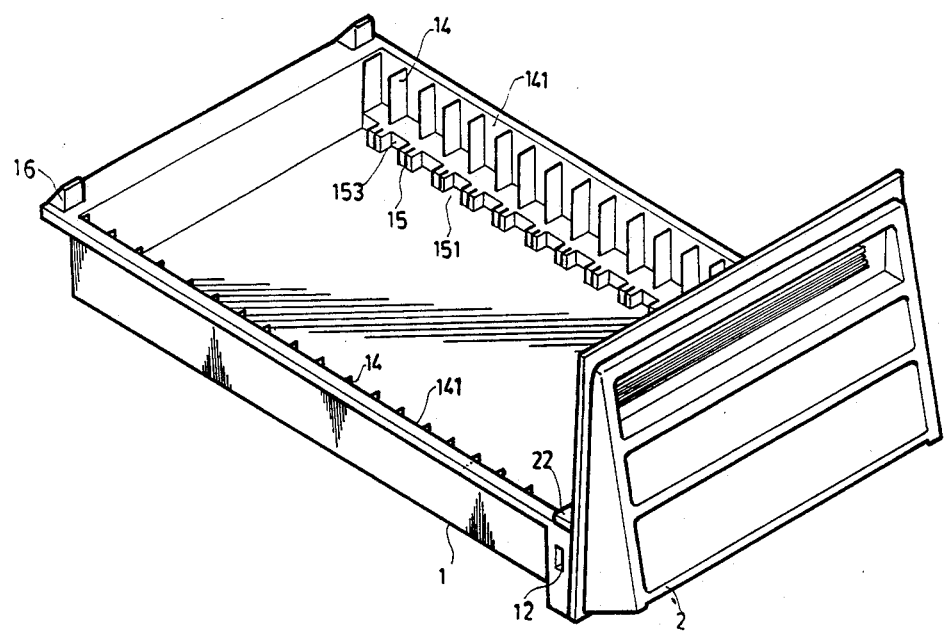
FIG. 1 is a perspective assembly view of a multipurpose storage case embodying the present invention.
Figure 6:
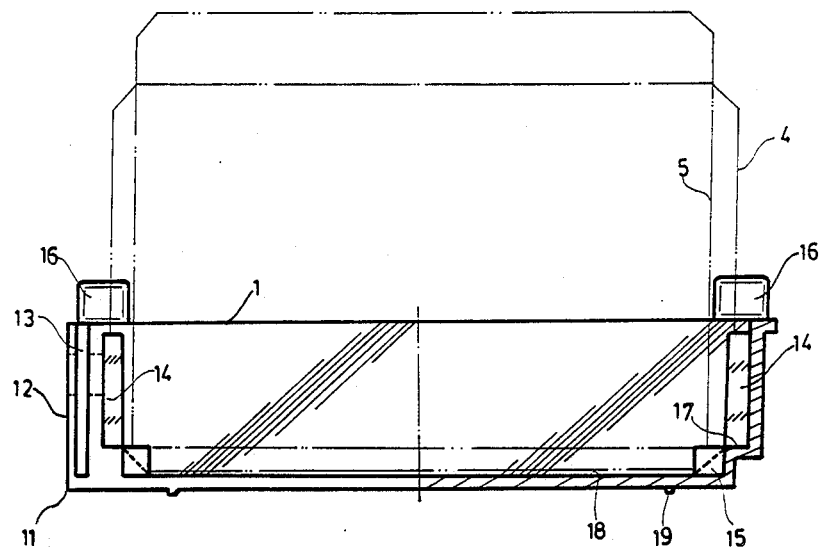
FIG. 6 is a sectional view of the embodiment of FIG. 1.

DESCRIPTION OF THE DESIGNATED NUMERALS (1) Casing
(13) Vertical slot
(141) Upper receiving space
(152) Notch
(17) Platform
(211) Neck portion
(214) Side wall
(31) Upper cover portion
(331) Stop end
(5) CD
(11) Connecting end
(14) Division plate
(151) Lower receiving space
(153) Depth
(2) Hand-hold
(212) Front end portion
(22) Elongated strip
(32) Lower cover portion
(34) Back cover portion
(12) Notch
(15) Projecting block
(16) Raised block
(21) Trapezoid block
(213) Base portion
(3) Cover frame
(33) Side cover portion
(4) Recording tape.

DETAILED DESCRIPTION OF THE PREFERRED EMBODIMENT

Turning now to the attached drawings in detail, therein illustrated in a basic form of multipurpose storage case embodying the present invention. In this embodiment, the storage case is designed for storage of recording tapes and CDs. Of course, through modification on size without departing from the basic teachings of the present invention, a multipurpose storage case of the present invention may serve for storage of recording tapes, CDs, and video tapes concomitantly.

As shown in FIGS. 1 and 2, the multipurpose storage case is generally comprised of a casing (1) coupled with a handle (2). The casing (1) comprises a pair of connecting ends (11) bilaterally disposed at the front opening for connection thereto of the handle (2). The connecting ends (11) each comprise a vertical slot (13), and a notch (12) transversely piercing through the both sides thereof. The handle (2) comprises two trapezoid blocks (21) bilaterally made on the back side to respectively match with the vertical slots (13) of the two connecting ends (11) of the casing (1), and an elongated strip (22) horizontally disposed at the back side above the two trapezoid blocks (21). Each of the trapezoid blocks (21) includes a narrow front end portion (212), a wide base portion (213), two beveled side walls (214), and a neck portion (211), in which the neck portion is integrally raised from the back wall surface of the handle (2). When in connection of the handle (2) to the casing (1), the trapezoid blocks (21) of the handle (2) are respectively having narrow front end portions (212) inserted into the vertical slots (13) of the two connecting ends (11) of the casing (1) with the wide base portions (213) respectively engaged with the notches (12) of the two connecting ends (11), and the elongated strip (22) is directly mounted on the top of the two connecting ends (11) to stabilize the connection.

In the casing, there are two platforms (17) upstanding from the bottom surface (18) at body sides. A plurality of division plates (14) are equidistantly mounted on each platform (17) to define therebetween a plurality of upper receiving spaces (141) for setting therein of recording tapes (4). The platforms (17) each comprise unitarily a plurality of projecting blocks (15) horizontally extending therefrom toward the center portion of the bottom surface (18). According to the present invention, the division plates (14) and the projecting blocks (15) at one lateral side of the casing (1) are symmetrically disposed against the division plates (14) and the projecting blocks (15) at the other lateral side of the casing (1). The projecting blocks (15) each include a bevel notch (152) made thereon in the middle for setting therein of one of the chamfers of the packing case of a CD. Of course, the notch (152) may be straight for directly setting therein of a CD without package. According to the present invention, the projecting blocks (15) are most preferably made in elongated strip-like configuration, so that more projecting blocks (15) may be made on the bilateral platforms (17) to define more notches (152) for receiving more CDs (5).

The storage case of the above described embodiment may be alternatively used for storage therein of recording tapes or CDs. Modifications may be made on the above-said embodiment to satisfy the demand for storage of video tapes. As an alternate form of the present invention utilized for receiving therein video tapes, the width of the casing (1) is properly widened and the upper receiving spaces (141) above the bilateral platforms (17) between the division plates (14) are also properly widened according to the width of a video tape so that a video tape may be set in each two opposite upper receiving spaces (141). The projecting blocks (15) which extend from the bilaterally disposed platforms (17) toward the center portion of the bottom surface (18) of the casing (1) are properly arranged to define therebetween a plurality of lower receiving spaces (151). The depth (153) of each lower receiving space (151) is properly arranged so that a recording tape may be set in each two opposite lower receiving spaces (151), while a CD may be set in each two opposite bevel notches (152).

As described above, the present invention may be variously embodied to match with market demand for storage of two or three different items. The cover frame (3) (as illustrated in FIG. 4) may also be variously embodied to match with the structure of the casing (1). As illustrated, the cover frame (3) is detachable and generally comprised of an upper cover portion (31), a lower cover portion (32), a back cover portion (34) and a pair of side cover portions (33). The storage case of the present invention may be used to match with the cover frame (3) or may be separated therefrom. Because the hand-hold (2) is detachable, it may be put in the casing (1) to reduce space consumption for convenient packaging and carriage. When in application, the two raised blocks (16), which are bilaterally made on the casing (1) at the back end on the top, are obliquely inserted in the front opening of the cover frame (3) to respectively disposed at the back of the two stop ends (331), which are bilaterally made on the inner wall surface of the two side cover portions (33) at the front in the middle part, and the casing (1) is then smoothly pushed inside the cover frame (3) to become totally received therein. According to the present invention, a pair of opposite legs (19) are provided on the casing (1) at the bottom to facilitate sliding of the casing (1) in the cover frame (3).

As described above, the present invention is to provide such a storage case which can be used for concomitantly receiving therein video tapes, recording tapes and CDs or alternatively receiving therein either one or two of the said three items. It minimizes space consumption and makes the storage of the said items simple and convenient.

I claim:

1. A multipurpose storage case including:
   a casing comprising a pair of connecting ends bilaterally disposed at the front opening for connection thereto of a handle, said connecting ends each comprising a vertical slot with a notch transversely piercing through both sides thereof, two platforms upstanding from the bottom surface thereof at both sides, a plurality of division plates equidistantly mounted on each of said two platforms to respectively define therebetween a plurality of upper receiving spaces, said platforms each comprising unitarily a plurality of projecting blocks horizontally extending therefrom toward the center portion of the bottom surface of said casing and defining therebetween a plurality of lower receiving spaces, said projecting blocks each comprising a notch made therein in the middle; and
   a handle comprising two trapezoid blocks bilaterally made on the back side to respectively set in the notches of the two vertical slots of said two connecting ends of said casing, and an elongated strip horizontally disposed at the back side above said two traperzoid blocks.

2. The multipurpise storage case as set foth in claim 1, wherein the projecting blocks are most preferably made in elongated strip-like configuration, so that more projecting blocks may be made on the bilateral platforms to define more notches for receiving more CDs.

* * * * *